(12) United States Patent
Bui et al.

(10) Patent No.: US 7,102,846 B2
(45) Date of Patent: Sep. 5, 2006

(54) IDENTIFICATION OF LATERALLY POSITIONED SERVO BANDS EMPLOYING DIFFERENTIATING CHARACTERISTICS OF SERVO PATTERNS

(75) Inventors: Nhan Xuan Bui, Tucson, AZ (US); James Howard Eaton, Morgan Hill, CA (US); Junichi Fukuda, Sagamihara (JP); Glen Alan Jaquette, Tucson, AZ (US); Eiji Ogura, Yokohama (JP); Mark Allan Taylor, Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/215,132

(22) Filed: Aug. 29, 2005

(65) Prior Publication Data

US 2005/0280919 A1    Dec. 22, 2005

Related U.S. Application Data

(62) Division of application No. 10/638,041, filed on Aug. 8, 2003, now Pat. No. 7,002,763.

(51) Int. Cl.
G11B 5/584    (2006.01)
G11B 5/09    (2006.01)

(52) U.S. Cl. ............... 360/77.12; 360/48; 360/78.02; 360/75; 360/51

(58) Field of Classification Search ............... None
See application file for complete search history.

(56) References Cited

U.S. PATENT DOCUMENTS

| 5,121,270 | A | | 6/1992 | Alcudia et al. | 360/77.01 |
|---|---|---|---|---|---|
| 5,523,904 | A | | 6/1996 | Saliba | 360/77.12 |
| 5,689,384 | A | | 11/1997 | Albrecht et al. | 360/77.12 |
| 5,923,272 | A | * | 7/1999 | Albrecht et al. | 341/55 |
| 5,930,065 | A | * | 7/1999 | Albrecht et al. | 360/72.2 |
| 6,021,013 | A | | 2/2000 | Albrecht et al. | 360/53 |
| 6,031,673 | A | * | 2/2000 | Fasen et al. | 360/53 |
| 6,141,174 | A | | 10/2000 | Judge et al. | 360/76 |
| 6,169,640 | B1 | | 1/2001 | Fasen | 360/48 |
| 6,278,571 | B1 | * | 8/2001 | Bui et al. | 360/77.12 |
| 6,282,051 | B1 | | 8/2001 | Albrecht et al. | 360/75 |
| 6,320,719 | B1 | | 11/2001 | Albrecht et al. | 360/77.12 |
| 6,462,904 | B1 | | 10/2002 | Albrecht et al. | 360/122 |
| 6,525,898 | B1 | | 2/2003 | Chliwnyj et al. | 360/77.12 |
| 6,580,581 | B1 | * | 6/2003 | Bui et al. | 360/78.02 |
| 6,622,113 | B1 | * | 9/2003 | Koski et al. | 702/151 |
| 6,744,594 | B1 | * | 6/2004 | Denison et al. | 360/121 |

(Continued)

FOREIGN PATENT DOCUMENTS

EP    0940805 A2    9/1999

Primary Examiner—Wayne Young
Assistant Examiner—Dismery Mercedes
(74) Attorney, Agent, or Firm—John H. Holcombe

(57) ABSTRACT

In a tape having separate servo bands of patterns positioned laterally across the tape, the patterns of a separate servo band have at least one differentiating characteristic with respect to patterns of another of the separate servo bands. The differentiating characteristic allows identification of the separate servo bands. For example, the patterns of a separate servo band have differing azimuthal orientations of detectable transitions with respect to another servo band, such as being laterally inverted. In another, variations in the width of gaps of patterns are made with respect to another servo band. In another, variations are made in the number of the detectable transitions of patterns with respect to the patterns of another servo band.

1 Claim, 11 Drawing Sheets

U.S. PATENT DOCUMENTS

| | | | |
|---|---|---|---|
| 6,762,900 B1 * | 7/2004 | Bui et al. | 360/77.12 |
| 6,781,778 B1 * | 8/2004 | Molstad et al. | 360/48 |
| 6,912,104 B1 * | 6/2005 | Trabert et al. | 360/77.12 |
| 6,934,115 B1 * | 8/2005 | Kientz et al. | 360/77.12 |
| 7,002,763 B1 * | 2/2006 | Bui et al. | 360/48 |
| 2004/0032685 A1 | 2/2004 | Trabert et al. | 360/75 |
| 2004/0174132 A1 * | 9/2004 | Johnson et al. | 318/652 |
| 2004/0207943 A1 | 10/2004 | Nakao et al. | 360/48 |

* cited by examiner

IDENTIFICATION OF LATERALLY POSITIONED SERVO BANDS EMPLOYING DIFFERENTIATING CHARACTERISTICS OF SERVO PATTERNS

CROSS REFERENCE TO RELATED APPLICATION

This is a Divisional application of Ser. No. 10/638,041, filed Aug. 8, 2003, now U.S. Pat. No. 7,002,763, issued Feb. 21, 2006.

FIELD OF THE INVENTION

This invention relates to separate longitudinal servo bands which are laterally positioned on a linear data storage tape, and, more particularly, to identification of the servo bands for independent addressability.

BACKGROUND OF THE INVENTION

Linear data storage tape comprises a medium for storing large amounts of data, and typically comprises a plurality of data tracks that extend longitudinally along the tape. A common example comprises magnetic tape media, and a less common example comprises optical tape media. A tape head is employed for reading and/or writing data on the data tracks, and is typically shared between various data tracks or groups of data tracks, and is moved between tracks or groups of tracks in the lateral direction of the tape. In magnetic tape media, the tape head typically comprises a number of separate elements which read and/or write data with respect to a number of parallel tracks, and is provided with one or more separate servo read transducers, which are laterally offset from the read and/or write elements, so as to track follow a servo band and cause the read and/or write elements of the tape head to be guided along the data track or tracks. In optical tape media, the optical servo may be associated with an individual data track or a with a separate servo track.

One type of servo system for linear data storage tape is one in which separate servo bands are laterally positioned on the linear data storage tape. Each of the servo bands provides the servo guidance for a group of data tracks, and the servo transducer of the tape head is repositioned laterally within a servo band so the read and/or write elements access different data tracks, and is repositioned laterally to another servo band to access still further data tracks. In one example, the servo bands are spaced apart and the data tracks are located between the servo bands. To insure that the servoing is precise, two servo heads may be provided at either end of the tape head, straddling the data read and/or write elements. The lateral positioning may be obtained from either or both servo bands. The servo bands are encoded with essentially identical patterns for determining lateral position, such that the bands are substantially indistinguishable.

The lateral positioning of the tape head is typically accomplished by actuators, which may have mechanical or electromechanical components. Once the proper lateral positioning of the tape head has been accomplished, as the servo information being sensed by the servo transducer indicates, minor adjustments of the head to follow lateral movement of the tape or of the tracks on the tape may be made. During track following, sticking or other failure of the mechanical or electromechanical components can be ascertained from failure of the sensed servo information to show any correction. Similarly, lateral repositioning of the tape head to different tracks within the same servo band is accomplished by a continuous adjustment of position within the servo band. Hence, any sticking or other failure of the mechanical or electromechanical components can be ascertained by failure of the sensed servo information to show the desired movement.

However, the lateral repositioning of the head between the servo bands is typically conducted by a coarse actuator, which may have mechanical or electromechanical components, such as a stepper motor, and which typically operates in open loop without feedback. Thus, as the tape head is repositioned between the servo bands, there is no feedback from the servo information to indicate that the switch from one servo band to any other servo band was successful, and, if the servo bands are substantially indistinguishable, at the supposed completion of the lateral movement, the tape head may be positioned at the wrong servo band, and the servo information will not indicate an error.

One way of determining whether the lateral movement has caused the tape head to be positioned at the correct servo band, is to provide a separate "independent" sensor, for example, that determines the approximate lateral position of the head with respect to the tape. Such an independent sensor may comprise a coarse optical sensor that measures the physical position of the head. Such a coarse sensor cannot be used for track following, but provides a backup to the actual servo system. Such extra sensors add cost to a tape drive, which is always undesirable, if the extra cost can be avoided. Another example is shown by U.S. Pat. No. 6,169,640, in which timing based servo bands are longitudinally displaced or offset from each other, such that by simultaneously sensing two adjacent servo bands allows the servo system to determine longitudinal offset between servo bands, from which the data band location of the tape head can be determined. The system, however, requires that both servo bands be sensed simultaneously in order to establish a differentiation and make a determination.

SUMMARY OF THE INVENTION

The present invention comprises, in one embodiment, a linear data storage tape having servo information comprising a plurality of separate servo bands of patterns of detectable transitions positioned longitudinally along the linear data storage tape, at least one of which detectable transitions is non-parallel to another detectable transition in the pattern, and the separate servo bands positioned laterally across the linear data storage tape; and the patterns of the separate servo bands are laterally aligned, and at least one of the patterns of a separate servo band having at least one differentiating characteristic with respect to at least one of the laterally aligned patterns of another of the separate servo bands. The differentiating characteristic allows identification of the separate servo bands.

The differentiating characteristic may comprise differing azimuthal orientations of the continuously longitudinally variable detectable transition of the laterally aligned patterns of the separate servo bands. In one example, the continuously longitudinally variable detectable transitions are inverted in the lateral direction.

Where the laterally aligned patterns comprise a plurality of gaps between the detectable transitions; the differentiating characteristic may comprise variations in the gaps of the laterally aligned patterns of the separate servo bands, the variations in the gaps comprising at least one expanded gap offset by at least one narrowed gap in a pattern, such that the separate patterns of the separate servo bands maintain the lateral alignment.

The differentiating characteristic may comprise variations in the number of the detectable transitions of the laterally aligned patterns of the separate servo bands. For example, where the laterally aligned patterns comprise at least one gap between the detectable transitions, the variations in the number of the detectable transitions of the laterally aligned patterns of the separate servo bands, may be offset by corresponding variations in the number of the gaps, such that the separate patterns of the separate servo bands maintain the lateral alignment.

The differentiating characteristic may comprise variations in stripe width, comprising the longitudinal distance between sets of sequential alternating opposite polarity detectable transitions; or may comprise reversed polarities of stripes, comprising the sets of sequentially alternating opposite polarity detectable transitions. Lateral alignment, if any, is independent of the variations in width or reversal of polarities.

Magnetic tape cartridges with the differentiating characteristic(s), servo writers, methods for providing the differentiating characteristic(s), and servo readers and tape drives for reading the servo information having the differentiating characteristic(s) are also provided.

If lateral alignment of the separate patterns is not necessary, in one embodiment, where the patterns of detectable transitions are positioned longitudinally along the linear data storage tape, the detectable transitions comprising at least one continuously longitudinally variable detectable transition that extends in the lateral direction of the separate servo band, and is non-parallel to another detectable transition in the pattern; and the separate servo bands are positioned laterally across the linear data storage tape; at least one of the patterns of a separate servo band has differing azimuthal orientations of at least one continuously longitudinally variable detectable transition with respect to at least one of the patterns of another of the separate servo bands. For example, the differing azimuthal orientations may comprise inverting the continuously longitudinally variable detectable transition in the lateral direction with respect to at least one of the patterns of another of the separate servo bands. Where at least one continuously longitudinally variable detectable transition comprises a straight line that is slanted in the lateral direction, the differing azimuthal orientations may comprise differing azimuthal orientations of the slant of the continuously longitudinally variable detectable transition with respect to at least one of the patterns of another of the separate servo bands.

In a further embodiment, if lateral alignment of the separate patterns is not necessary, and the patterns comprise at least one gap between the non-parallel detectable transitions; and the separate servo bands are positioned laterally across the linear data storage tape; at least one of the patterns of a separate servo band has variations in the gap of the pattern with respect to at least one of the patterns of another of the separate servo bands. For example, where the detectable transitions of a pattern are arranged with at least one of the detectable transitions in one orientation, and at least one detectable transition in a non-parallel orientation with respect to the one orientation, having a first gap therebetween, and the patterns comprise at least a second gap between the pattern and a sequentially adjacent pattern; and wherein the variations in the gap of the patterns of the separate servo bands comprises an expanded one of the first gap and/or the second gap, and a narrowed one of the first gap and/or the second gap. In another example, where the detectable transitions of a pattern are arranged in a first burst of at least one of the detectable transitions in a first azimuthal orientation, a second burst of at least one of the detectable transitions in a second azimuthal orientation, a third burst of at least one of the detectable transitions in the first azimuthal orientation, and a fourth burst of at least one of the detectable transitions in the second azimuthal orientation, and first gaps separating the first and the second bursts and separating the third and the fourth bursts, and second gaps separating the second and the third bursts and separating a sequentially adjacent pattern; and the variations in the gap of the patterns of the separate servo bands comprises an expanded one of a set of the first gaps and a set of the second gaps and narrowed one of a set of the second gaps and a set of the first gaps. This has the same effect as though one of the servo bands was offset laterally a small amount, and added to at one side and truncated at the opposite side, such that the servo system can easily adjust to either band.

In another embodiment, if lateral alignment of the separate patterns is not necessary, and the patterns comprise detectable transitions positioned longitudinally along the linear data storage tape, at least one of which detectable transitions is non-parallel to another detectable transition in the pattern; and the separate servo bands positioned laterally across the linear data storage tape; at least one of the patterns of a separate servo band has variations in the number of the detectable transitions of the pattern with respect to at least one of the patterns of another of the separate servo bands. Additionally, for example, where at least one of the patterns of the separate servo bands comprises at least one gap between the detectable transitions, at least one of the patterns of a separate servo band additionally comprises variations in the number of the gaps with respect to at least one of the patterns of another of the separate servo bands. As another example, the variations in the number of the detectable transitions of the patterns of the separate servo bands, corresponds to the variations in the number of the gaps. Alternatively, the patterns may additionally comprise variations in the spacing between the detectable transitions.

Magnetic tape cartridges, servo writers, methods, and servo readers and tape drives for reading the servo information are also provided for these embodiments.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
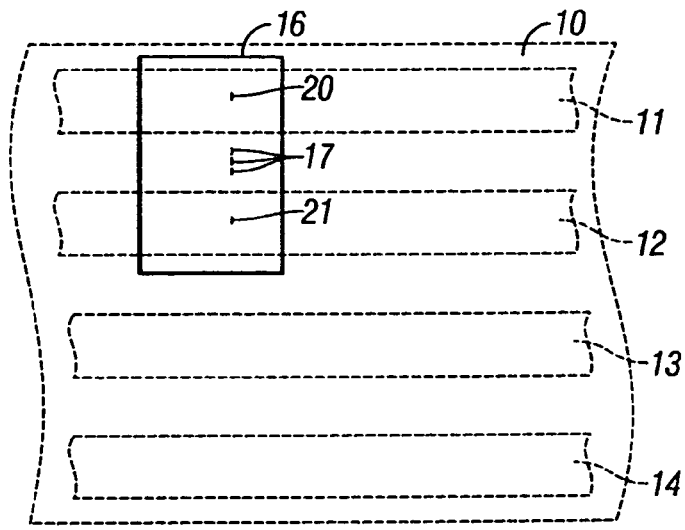
FIG. 1 is a schematic representation of a tape head and a segment of a linear data storage tape with a plurality of separate servo bands in accordance with the present invention.
Figure 2:
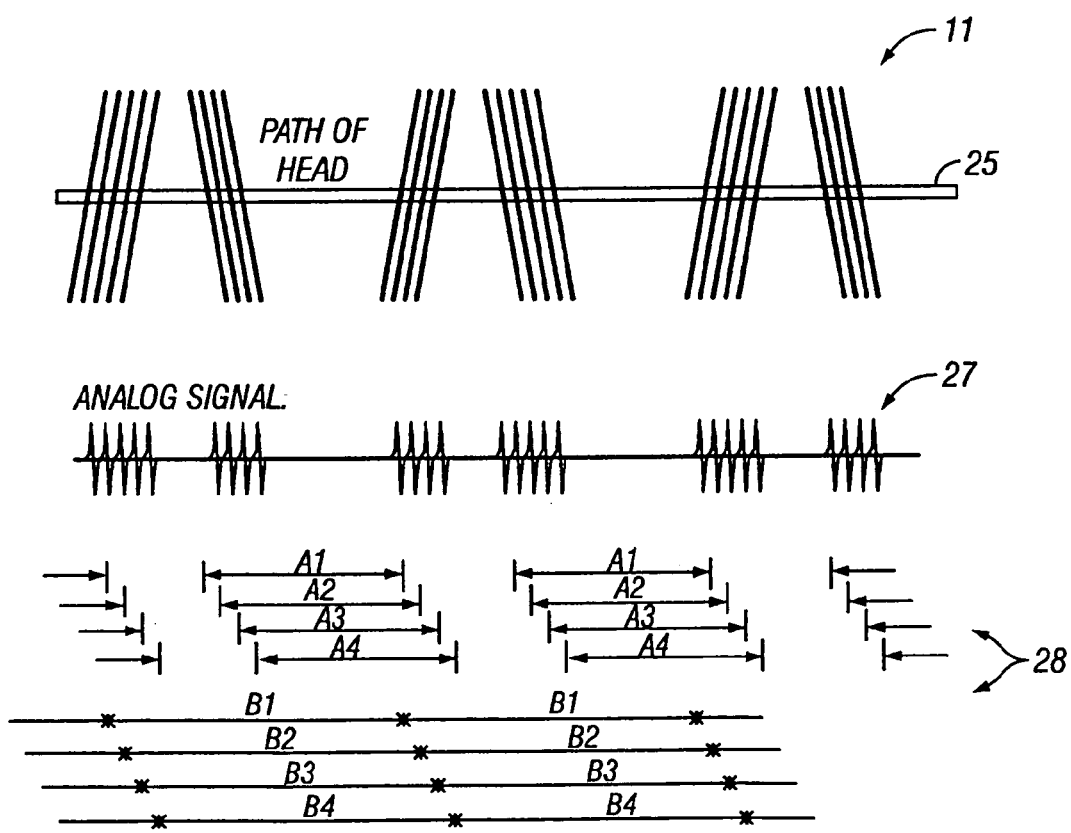
FIG. 2 is a representation of a servo transducer as it tracks one of the servo bands of FIG. 1, along with a representation of the servo output signal it generates and the corresponding signal intervals.

FIGS. 1 and 2 illustrate a servo system and a linear data storage tape 10, the linear data storage tape having a plurality of separate longitudinal servo bands 11, 12, 13 and 14, which are laterally positioned on the linear data storage tape, and which are identifiable in accordance with the present invention. The example of FIG. 1 comprises a magnetic tape media with magnetically written servo bands, and with data tracks positioned between the servo bands. In magnetic tape media, a tape head 16 typically comprises a number of separate elements 17, which read and/or write data with respect to a number of parallel data tracks, and is provided with a separate servo transducer, or servo transducers 20, 21, which are laterally offset from the read and/or write elements 17, so as to track follow the servo track and be guided along the data track or tracks.

FIG. 2 illustrates a servo transducer path 25 as the servo transducer tracks one of the servo bands of FIG. 1, e.g. servo band 11, along with a representation of the generated servo output signal 27 and the corresponding signal intervals 28. The exemplary servo band is of the type described in U.S. Pat. No. 5,689,384, which comprises patterns of transitions recorded at more than one azimuthal orientation across the width of the servo band, and which are therefore non-parallel. The timing 28 of the signal 27 derived from reading at any point across the width of such a pattern varies continuously as the servo transducer 20 of FIG. 1 is moved laterally across the servo track, since the servo transducer 20 is small compared to the width of the servo pattern. Lateral position sensing is achieved by deriving a ratio of two servo pattern intervals A and B of FIG. 2 and therefore is insensitive to tape speed during reading.

Referring to FIG. 1, the read and/or write elements 17 are typically shared between various data tracks or groups of data tracks, and is moved between tracks or groups of tracks in the lateral direction of the tape. Each of the servo bands 11, 12, 13 and 14, provides the servo guidance for a group of data tracks, and the servo transducer 20, 21 of the tape head is repositioned laterally within a servo band to cause the read and/or write elements 17 to access different data tracks, and is repositioned laterally to another servo band to access still further data tracks. In one example, the servo bands are spaced apart to span the data tracks, which are located between the servo bands. This places a servo band close to the corresponding data tracks to reduce the span between the outer read and/or write elements and the servo band, and reduce sensitivity to changes in tape width between the time data is written and read back. To insure that the servoing is precise, two servo transducers 20, 21 may be provided at either end of the tape head, straddling the data read and/or write elements. The lateral positioning may be obtained from either of the two servo bands, or by averaging or otherwise comparing data from the two servo bands.

The lateral positioning of the tape head is typically accomplished by actuators, which may have mechanical or electromechanical components. Once the proper lateral positioning of the read and/or write elements 17 of the head 16 has been accomplished, as the servo information being sensed by the servo transducer 20, 21 indicates, minor adjustments of the head 16 to follow lateral movement of the tape or of the tracks on the tape may be made. During track following, sticking or other failure of the mechanical or electromechanical components can be ascertained from failure of the sensed servo information to show any correction. Similarly, lateral repositioning of the tape head to different tracks within the same servo band is accomplished by a continuous adjustment of position within the servo band. Hence, any sticking or other failure of the mechanical or electromechanical components can be ascertained by failure of the sensed servo information to show the desired movement.

However, the lateral repositioning of the head from one of the servo bands 11, 12, 13 and 14, to another, is typically conducted by a coarse actuator, which may have mechanical or electromechanical components, such as a stepper motor, and which typically operates without feedback. Thus, as the tape head is repositioned between the servo bands, there is no feedback from the servo information to indicate that the switch from one servo band to any other servo band was successful, and, if the servo bands are substantially indistinguishable, at the supposed completion of the lateral movement, the tape head may be positioned at the wrong servo band, and the servo information will not indicate an error.

In accordance with an aspect of the present invention, wherein the separate servo bands 11, 12, 13 and 14, are positioned laterally across the linear data storage tape; the patterns of the separate servo bands are laterally aligned, and at least one of the patterns of a separate servo band is provided with at least one differentiating characteristic with respect to at least one of the laterally aligned patterns of another of the separate servo bands. The differentiating characteristic allows identification of the separate servo bands.

The differentiating characteristic of the present invention may be stored in memory and employed to determine the servo band being sensed without need to simultaneously compare the two. Further, two or more servo bands may be read if desired, not necessarily simultaneously, in order to make the determination. Thus, alternatively, if lateral misalignment of the separate patterns is compensated for, or alignment is otherwise not necessary, it is not necessary that the servo bands be aligned.

Figure 3:
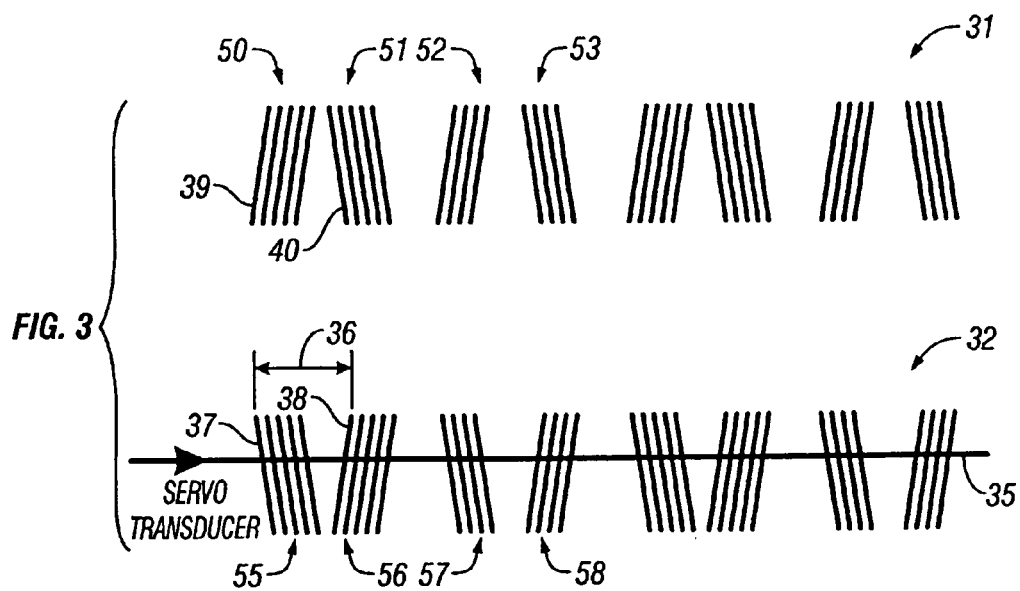
FIG. 3 is a representation of patterns of two separate servo bands of FIG. 1, having an embodiment of differentiating characteristics with respect to each other, in accordance with the present invention, comprising differing azimuthal orientations of continuously longitudinally variable detectable transitions of the patterns of the separate servo bands, in which the transitions are inverted.

FIG. 3 illustrates one type of differentiating characteristic, comprising differing azimuthal orientations of the continuously longitudinally variable detectable transition of the laterally aligned patterns of the separate servo bands 31 and 32. In the example of FIG. 3, the continuously longitudinally variable detectable transitions are inverted in the lateral direction. The servo band is identified by altering the path 35 in the lateral direction and determining whether the "A" timing 36, e.g. between detectable transitions 37 and 38, becomes shorter or longer. For example, if the path 35 of the servo transducer is moved upwardly, toward servo band 31 while still remaining in servo band 32, the timing between detectable transitions 37 and 38 becomes greater, identifying the separate servo band. If the servo transducer is instead in servo band 31, and the path of the servo transducer is moved in the same direction, upwardly, the timing between detectable transitions 39 and 40 becomes less, identifying the separate servo band.

Figure 4:
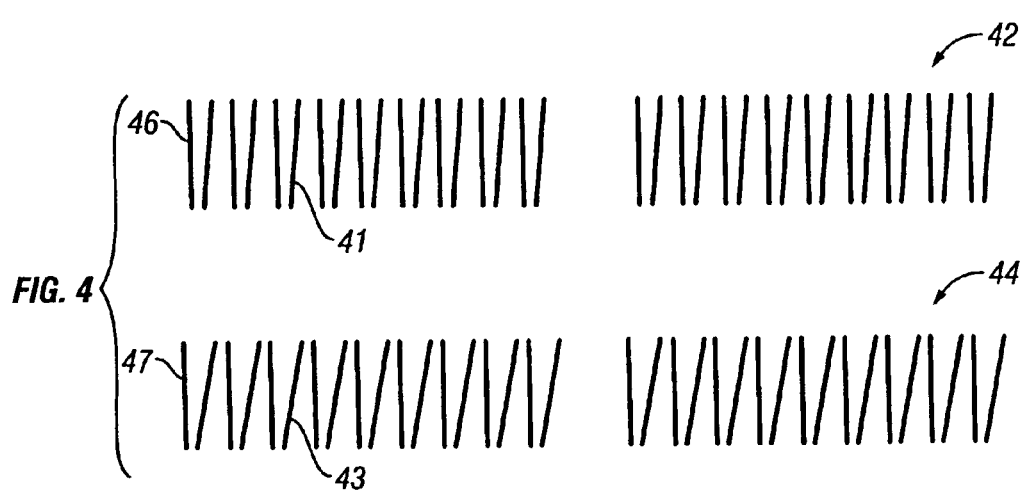
FIG. 4 is a representation of patterns of two separate servo bands of FIG. 1, having an embodiment of differentiating characteristics with respect to each other, in accordance with the present invention, comprising differing azimuthal orientations of continuously longitudinally variable detectable (slanted) transitions of the patterns of the separate servo bands.

Another example of differing azimuthal orientations of the continuously longitudinally variable detectable transition of the laterally aligned patterns of the separate servo bands is illustrated in FIG. 4. At least one continuously longitudinally variable detectable transition 41 of servo band 42 comprises a straight line that is slanted in the lateral direction, and the differentiating characteristic comprises differing azimuthal orientations of the slant of the detectable transition 41 with respect to a continuously longitudinally variable detectable transition 43 of servo band 44. The servo band is identified by altering the servo transducer path in the lateral direction and determining the rate of change of the "A" timing, e.g. between detectable transitions 46 and 41. For example, if the servo transducer is in servo band 44, and is moved upwardly, toward servo band 42, the timing between detectable transitions 47 and 43 becomes greater more rapidly than if it were in servo band 42, identifying the separate servo band. If the servo transducer is instead in servo band 42, and the path of the servo transducer is moved in the same direction, upwardly, the timing between detectable transitions 46 and 41 becomes greater at a less rapid rate, identifying the separate servo band. Alternatively, the timing could be measured toward the upper edge of the separate servo band, and the timing between detectable transitions 47 and 43 would exceed the largest possible timing between that of detectable transitions 46 and 41, identifying the separate servo band 44. Similarly, the timing between detectable transitions 46 and 41 would be less than the expected timing between that of detectable transitions 47 and 43, identifying the separate servo band 42.

Referring to FIGS. 1, 3 and 4, at least three separate servo bands 11, 12, 13 and 14, are written on the linear data storage tape positioned in sequence laterally across the linear data storage tape, such that the patterns of the separate servo bands provide the differentiating characteristic with respect to the patterns of the next separate servo band in the sequence. For example, servo bands 11 and 13 may correspond to servo band 31 of FIG. 3, and servo bands 12 and 14 of FIG. 1 may correspond to servo band 32 of FIG. 3. As another example, servo bands 11 and 13 may correspond to servo band 42 of FIG. 4, and servo bands 12 and 14 of FIG. 1 may correspond to servo band 44 of FIG. 4.

Referring to FIG. 3, the detectable transitions of a pattern of a servo band 31 may be written in a first burst 50 of at least one of the detectable transitions in a first azimuthal orientation, a second burst 51 of at least one of the detectable transitions in a second azimuthal orientation, a third burst 52 of at least one of the detectable transitions in the first azimuthal orientation, and a fourth burst 53 of at least one of the detectable transitions in the second azimuthal orientation; with the differing azimuthal orientations of any of the bursts of the pattern with respect to at least one of the patterns of another of the separate servo bands, for example, inverted in the lateral direction with respect to any or each of bursts 55, 56, 57 and/or 58 of servo band 32.

In each instance, the differentiating characteristic may comprise one or more of the patterns of the servo bands. Once the differentiating characteristic is employed to identify the servo band being read by the servo transducer, the determination does not need to be repeated. Only if the servo transducer is moved out of a servo band, for example, to another servo band, does the open loop character of the servo system require that the newly encountered servo band be identified.

Figure 5:
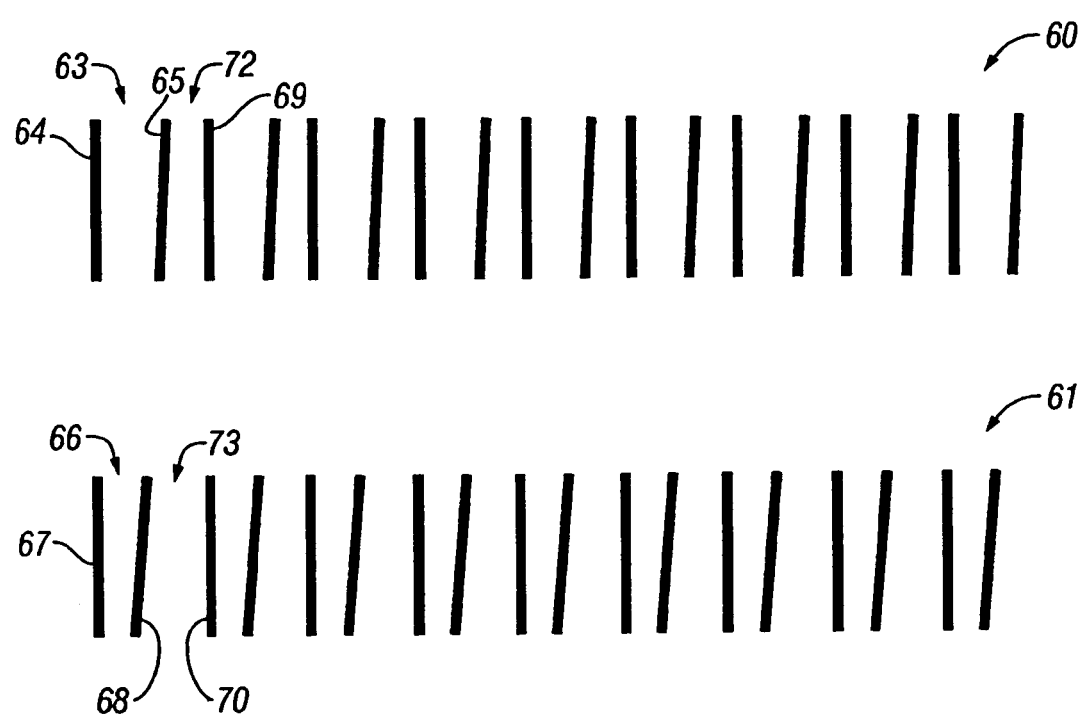
FIG. 5 is a representation of patterns of two separate servo bands of FIG. 1, having an embodiment of differentiating characteristics with respect to each other, in accordance with the present invention, comprising variations in gaps of the patterns of the separate servo bands.

FIG. 5 illustrates another type of differentiating characteristic, comprising variations in gaps of the patterns of the separate servo bands 60 and 61, where there are a plurality of gaps between the detectable transitions. If lateral alignment of the patterns is necessary, at least one expanded gap in a pattern is offset by at least one narrowed gap in the pattern, such that the separate patterns of the separate servo bands maintain the lateral alignment.

In the example of FIG. 5, the gap 63 between detectable transitions 64 and 65 of servo band 60 is larger than the corresponding gap 66 between detectable transitions 67 and 68 of servo band 61. The servo band is identified by determining the "A" timing, e.g. between transitions 64 and 65, as compared to the "B" timing, e.g. between transitions 64 and 69. The "A" timing of servo band 60 will comprise a larger share of the "B" timing, as with respect to the timing of servo band 61, where the "A" timing, e.g. between transitions 67 and 68, will comprise a smaller share of the "B" timing, e.g. between transitions 67 and 70.

Alternatively, the gap 72 between detectable transitions 65 and 69 of servo band 60 is smaller than the corresponding gap 73 between detectable transitions 68 and 70 of servo band 61. The servo band is identified by determining the "A" timing, e.g. between transitions 65 and 69, as compared to the "B" timing, e.g. between transitions 64 and 69. The "A" timing of servo band 60 will therefore comprise a smaller share of the "B" timing, as compared to the timing of servo band 61, where the "A" timing, e.g. between transitions 68 and 70, will comprise a larger share of the "B" timing, e.g. between transitions 67 and 70.

If lateral alignment of the servo patterns is not necessary, the variations of gaps need not offset. Hence, some of all gaps of a servo band may be narrowed (or expanded) as compared to a separate servo band. If all gaps of a pattern or of a servo band are narrowed (or expanded), the effect is to alter the frequency of the transitions as compared to a separate servo band. The nominal length of the pattern is also varied, changing the "A" and "B" distances of the separate servo bands.

Figure 6:
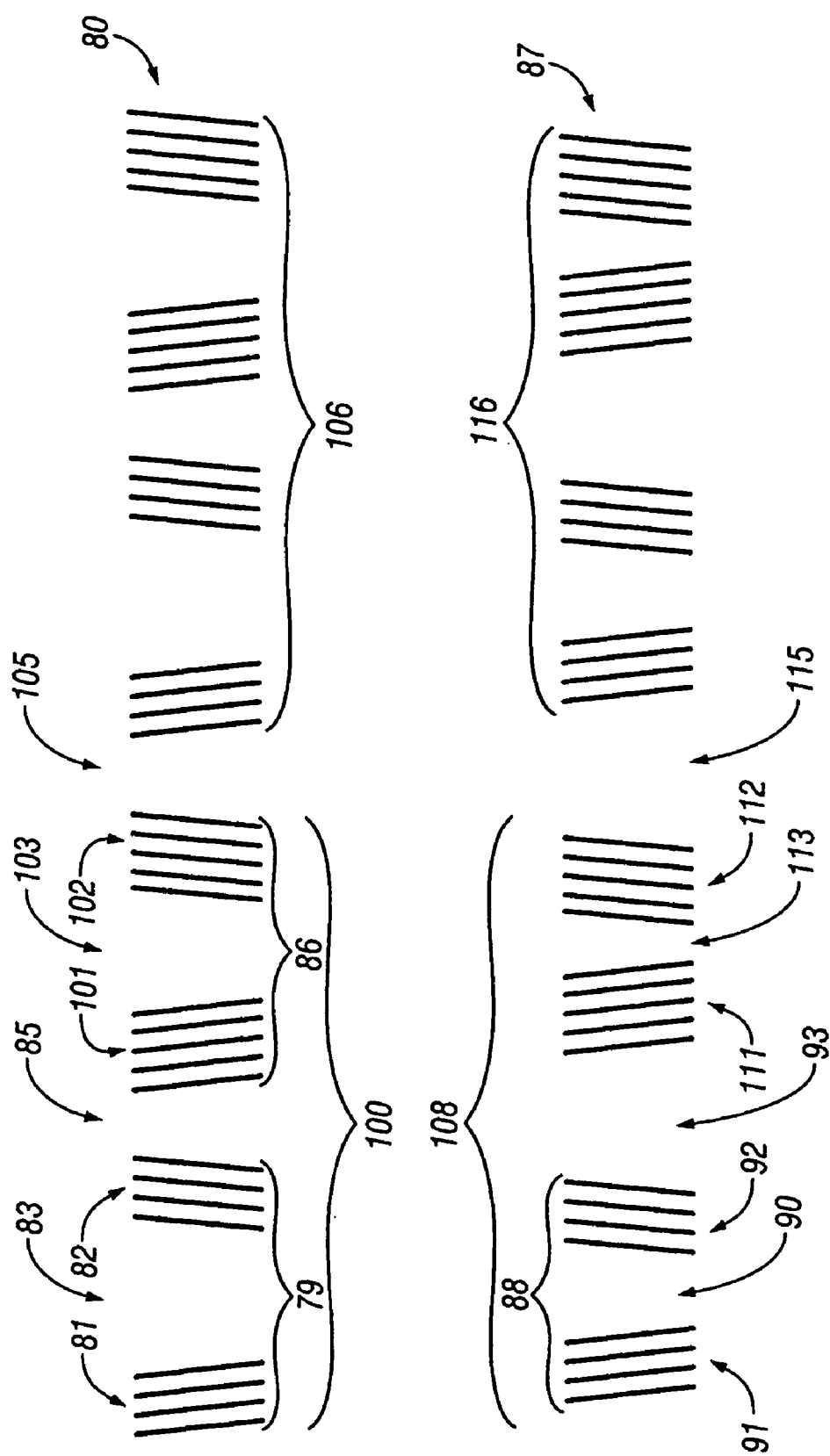
FIG. 6 is a representation of patterns of two separate servo bands of FIG. 1, having an alternate embodiment of variations in gaps of the patterns of the separate servo bands, in accordance with the present invention.

FIG. 6 illustrates another example of variations in gaps of the patterns of the separate servo bands. In the example of FIG. 6, the detectable transitions of a pattern 79 of servo band 80 are arranged with at least one of the detectable transitions, e.g. of burst 81, in one orientation, and at least one detectable transition, e.g. of burst 82, in a non-parallel orientation with respect to the orientation of burst 81, having at least one first gap 83, which in the example is an expanded gap; and at least a second gap 85 between the pattern 79 and a sequentially adjacent pattern 86, which in the example is a narrowed second gap 85. In the next servo band 87, a pattern 88 comprises a first gap 90 between a burst 91 of at least one detectable transition and burst 92 of a least one detectable transition which is non-parallel with respect to the orientation of burst 91, which in the example is a narrowed gap 90. At least a second gap 93 is provided between the pattern 88 and a sequentially adjacent pattern 95, which in the example is an expanded second gap 93. The differentiating characteristic comprises an expanded first gap 83 of servo band 80, and a narrowed first gap 90 of servo band 87. Alternatively, the differentiating characteristic comprises a narrowed second gap 85 of servo band 80, with respect to the expanded second gap 93 of servo band 87. If lateral alignment of the patterns is necessary, at least one expanded gap in a pattern is offset by at least one narrowed gap in the pattern, such that the laterally aligned separate patterns of the separate servo bands maintain the lateral alignment. Further, the differentiating characteristic comprises the expanded first gap 83 of servo band 80, with respect to a narrowed first gap 90 of servo band 87, and the narrowed second gap 85 of servo band 80, with respect to the expanded second gap 93 of servo band 87. This arrangement has the same effect as though one of the servo bands was offset laterally a small amount, and added to at one side and truncated at the opposite side, such that the servo system can easily adjust to either band.

The determination of the servo band being sensed is made by directly measuring a gap or gaps of a servo band comparing the measurement to other elements of the timing of the patterns of the servo band. Alternatively, the time of traverse between the bursts of two of the servo bands may be compared to determine which gap(s) are narrowed versus which gap(s) are expanded.

Still referring to FIG. 6, in another example, where the detectable transitions of a pattern, e.g. pattern 100 of servo band 80, are arranged in a first burst 81 of at least one of the detectable transitions in a first azimuthal orientation, a second burst 82 of at least one of the detectable transitions in a second azimuthal orientation, a third burst 101 of at least one of the detectable transitions in the first azimuthal orientation, and a fourth burst 102 of at least one of the detectable transitions in the second azimuthal orientation, and first gaps 83, 103 separating the first and the second bursts and separating the third and the fourth bursts, and second gaps 85, 105 separating the second and the third bursts and separating a sequentially adjacent pattern 106. The pattern 108 of the next servo band 87 has a similar arrangement, comprising a first burst 91 of at least one of the detectable transitions in a first azimuthal orientation, a second burst 92 of at least one of the detectable transitions in a second azimuthal orientation, a third burst 111 of at least one of the detectable transitions in the first azimuthal orientation, and a fourth burst 112 of at least one of the detectable transitions in the second azimuthal orientation, and first gaps 90, 113 separating the first and the second bursts and separating the third and the fourth bursts, and second gaps 93, 115 separating the second and the third bursts and separating a sequentially adjacent pattern 116. The variations in the gaps of the patterns of the separate servo bands comprises an expanded one of a set of the first gaps and/or a set of the second gaps and narrowed one of a set of the first gaps and/or a set of the second gaps.

If lateral alignment is necessary, the variations in the gaps of the patterns of the separate servo bands comprises an expanded set of the first gaps and a narrowed set of the second gaps in one servo band, and a narrowed set of the first gaps and an expanded set of the second gaps in the next servo band, or vice versa, such that the laterally aligned separate patterns maintain lateral alignment. This has the same effect as though one of the servo bands was offset laterally a small amount, and added to at one side and truncated at the opposite side, such that the servo system can easily adjust to either band.

As above, the determination of the servo band being sensed is made by directly measuring a gap or gaps of a servo band comparing the measurement to other elements of the timing of the patterns of the servo band. Alternatively, the time of traverse between the bursts of two of the servo bands may be compared to determine which gap(s) are narrowed versus which gap(s) are expanded.

In each instance, the differentiating characteristic may comprise one or more of the patterns of the servo bands. Once the differentiating characteristic is employed to identify the servo band being read by the servo transducer, the determination does not need to be repeated. Only if the servo transducer is moved out of a servo band, for example, to another servo band, does the open loop characteristic of the servo system require that the newly encountered servo band be identified.

Referring to FIGS. 1, 5 and 6, at least three separate servo bands 11, 12, 13 and 14, are written on the linear data storage tape positioned in sequence laterally across the linear data storage tape, such that the patterns of the separate servo bands provide the differentiating characteristic with respect to the patterns of the next separate servo band in the sequence. For example, servo bands 11 and 13 may correspond to servo band 60 of FIG. 5, and servo bands 12 and 14 of FIG. 1 may correspond to servo band 61 of FIG. 5. As another example, servo bands 11 and 13 may correspond to servo band 80 of FIG. 6, and servo bands 12 and 14 of FIG. 1 may correspond to servo band 87 of FIG. 6.

Figure 7:
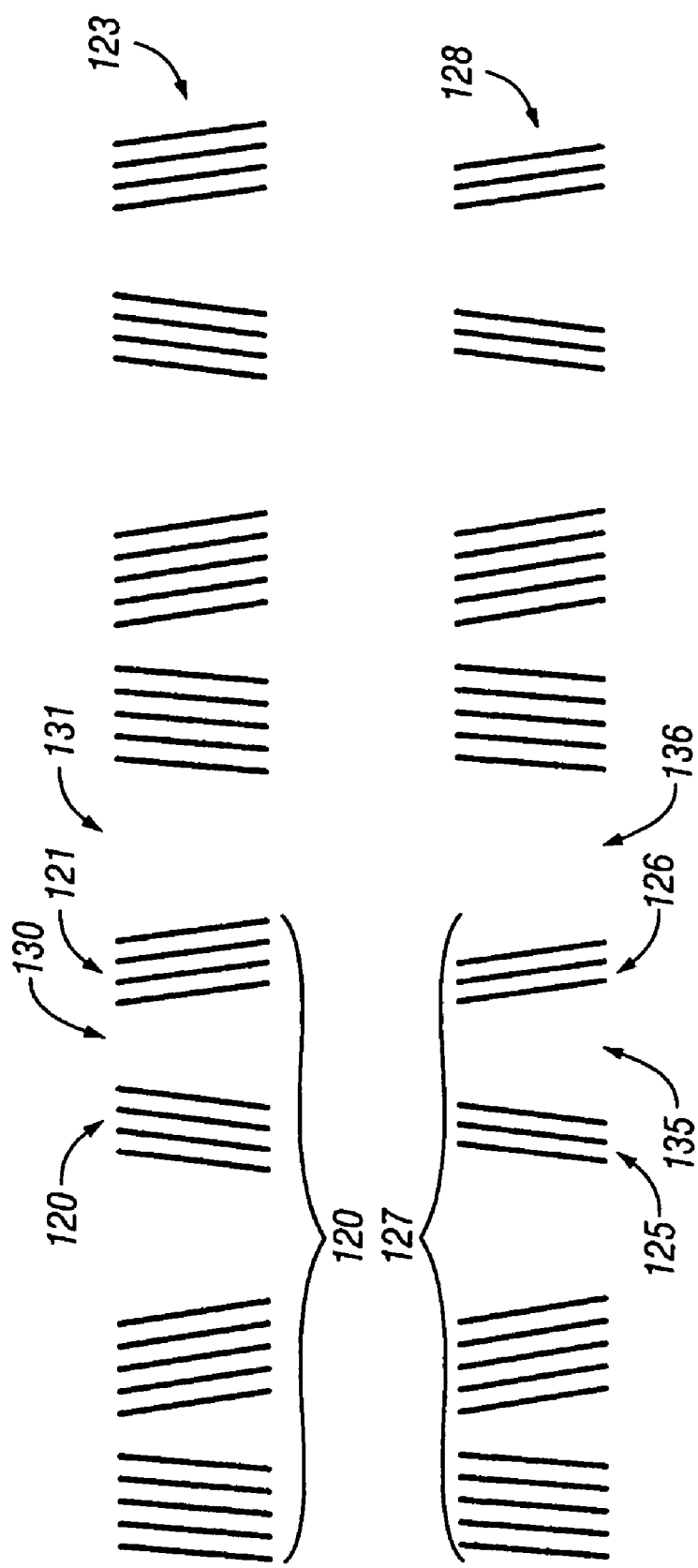
FIG. 7 is a representation of patterns of two separate servo bands of FIG. 1, having an embodiment of differentiating characteristics with respect to each other, in accordance with the present invention, comprising variations in the number of detectable transitions of the separate servo bands.

FIG. 7 illustrates another differentiating characteristic, comprising variations in the number of detectable transitions of a pattern or patterns of one servo band with respect to at least one of the patterns of another of the separate servo bands. In the example of FIG. 7, the number of detectable transitions of bursts 120 and 121 of a pattern 122 of servo band 123 are different than the number of detectable transitions of bursts 125 and 126 of pattern 127 of servo band 128. The detectable transitions of burst 120 are in one orientation, and the detectable transitions of burst 121 are in a non-parallel orientation with respect to the orientation of burst 121, and the detectable transitions of bursts 125 and 126 are also non-parallel. If lateral alignment is necessary, variations in the width of gaps of the patterns of the separate servo bands compensate for the different numbers of detectable transition of the bursts. Thus, gaps 130 and 131 of servo band 123 are narrowed as compared to gaps 135 and 136 of servo band 128, such that the laterally aligned separate patterns maintain lateral alignment.

The determination of which servo band is being sensed is made by counting the detectable transitions in the pattern. Alternatively, the numbers of transitions in patterns of one servo band may be compared to that of the next servo band.

Referring to FIGS. 1 and 7, at least three separate servo bands 11, 12, 13 and 14, are written on the linear data storage tape positioned in sequence laterally across the linear data storage tape, such that the patterns of the separate servo bands provide the differentiating characteristic with respect to the patterns of the next separate servo band in the sequence. For example, servo bands 11 and 13 may correspond to servo band 123 of FIG. 7, and servo bands 12 and 14 of FIG. 1 may correspond to servo band 128 of FIG. 7.

Figure 8:
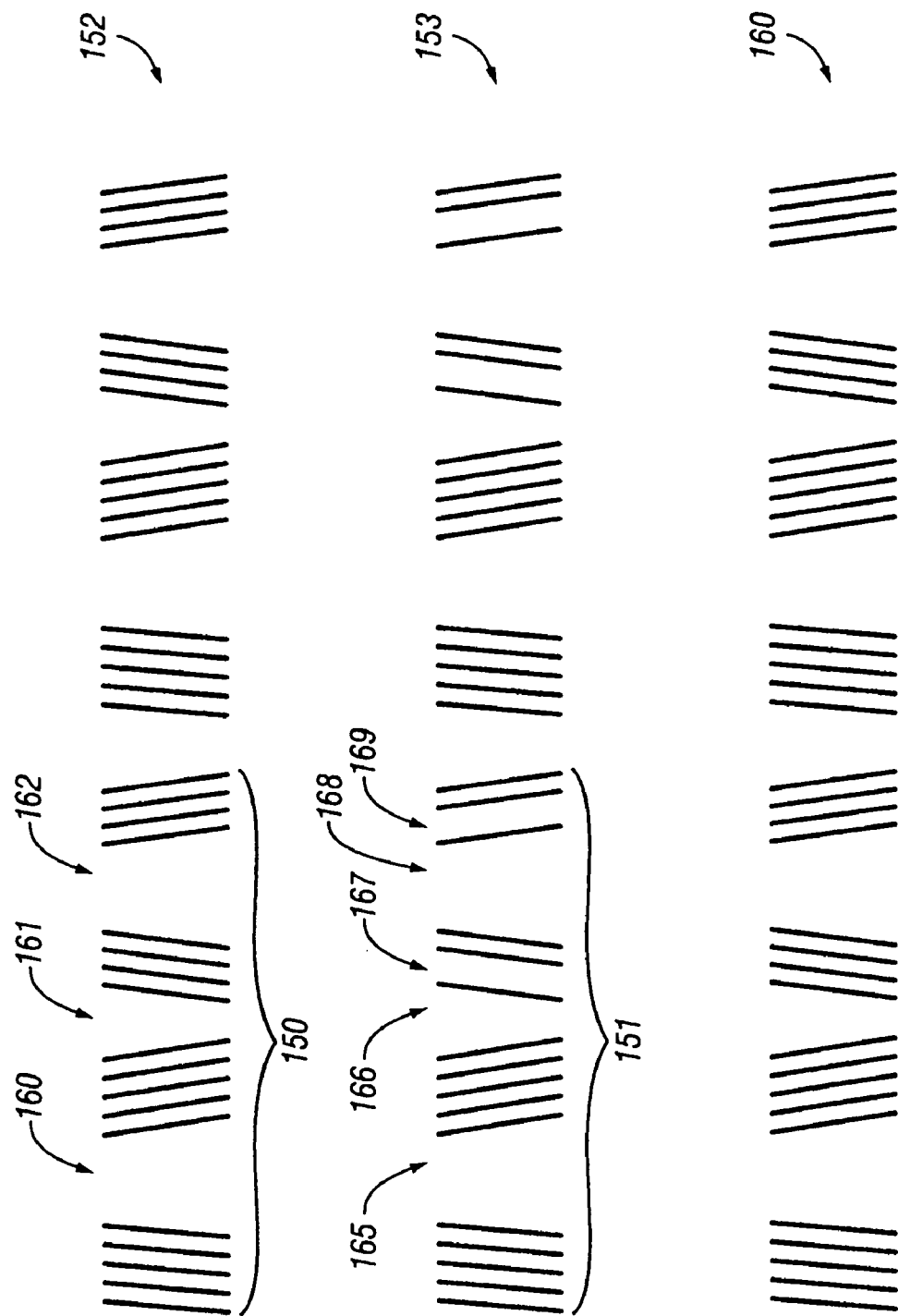
FIG. 8 is a representation of patterns of three separate servo bands of FIG. 1, having an alternative embodiment of variations in the number of detectable transitions of the separate servo bands, in accordance with the present invention.

FIG. 8 illustrates another example of variations in the number of detectable transitions of patterns of servo bands. In FIG. 8, at least one of the patterns 150, 151 of the separate servo bands 152, 153 having a variation in the number of detectable transitions comprises additionally comprises variations in the number of the gaps with respect to at least one of the patterns of another of the separate servo bands. For example, pattern 150 of servo band 152 has gaps 160, 161 and 162, whereas pattern 151 of the next servo band 153 has gaps 165, 166, 167, 168 and 169. As another example, the variations in the number of the detectable transitions of the patterns of the separate servo bands, corresponds to the variations in the number of the gaps. If lateral alignment of the patterns of the servo bands is necessary, the variations in the number of the detectable transitions of the laterally aligned patterns of the separate servo bands, and variations in the number of the gaps, correspond, such that the laterally aligned separate patterns of the separate servo bands maintain the lateral alignment. Thus, pattern 150 of servo band 152 comprises 18 detectable transitions, and 3 gaps, and pattern 151 of servo band 153 comprises 16 transitions and 5 gaps.

Another way of characterizing the variations in the number of gaps and transitions is to characterize it as stripe or transition "deletion" or "addition".

If more than two servo bands are provided, e.g. servo bands 152, 153 and 160 as illustrated in FIG. 8, they are written on the linear data storage tape positioned in sequence laterally across the linear data storage tape, such that the patterns of the separate servo bands provide the differentiating characteristic with respect to the patterns of the next separate servo band in the sequence. For example, servo bands 160 corresponds to servo band 152 and both are differentiated from servo band 153.

The determination of which servo band is being sensed is made by counting the detectable transitions in the pattern, or by counting the number of gaps in the pattern, or by counting both. Alternatively, the numbers of transitions and/or gaps in patterns of one servo band may be compared to that of the next servo band.

Figure 9:
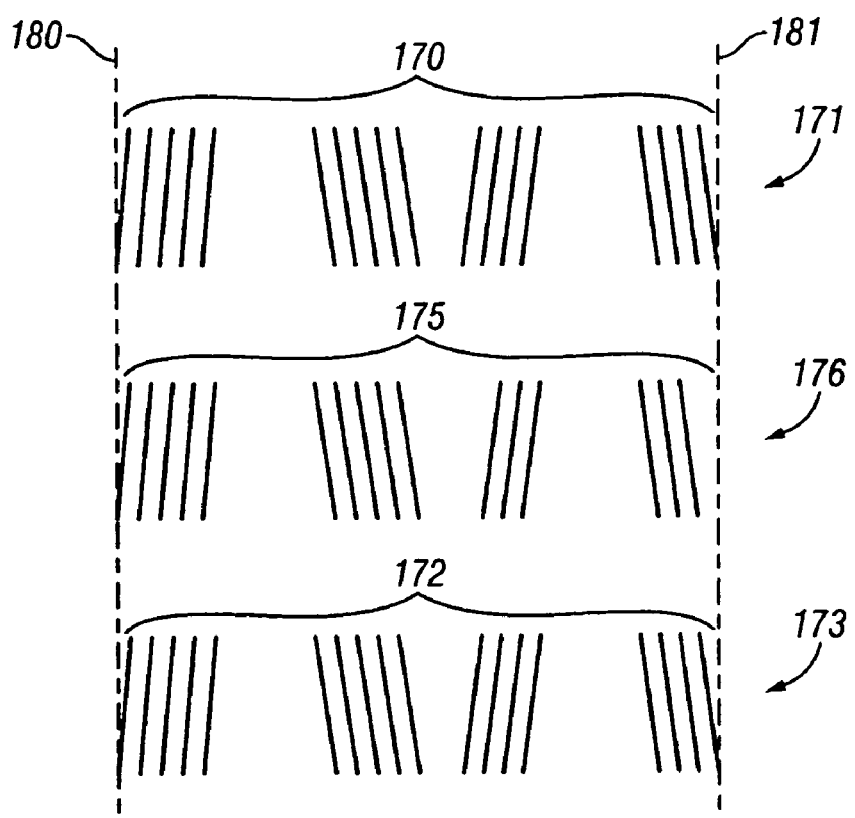
FIG. 9 is a representation of patterns of three separate servo bands of FIG. 1, having a further alternative embodiment of variations in the number of detectable transitions of the separate servo bands, in accordance with the present invention.

FIG. 9 illustrates still another example of variations in the number of detectable transitions of patterns of servo bands, and comprises variations in the spacing between the detectable transitions to offset the variations in the number of detectable transitions, such that the laterally aligned separate patterns of the separate servo bands maintain the lateral alignment between the patterns of the separate servo bands. In the example, pattern 170 of servo band 171 and pattern 172 of servo band 173 each comprises 18 transitions, and pattern 175 of servo band 176 comprises 16 transitions, and the spacings between transitions is expanded so that the patterns remain laterally aligned, as shown by alignments 180 and 181.

The determination of which servo band is being sensed is made by counting the detectable transitions in the pattern. Alternatively, the numbers of transitions in patterns of one servo band may be compared to that of the next servo band.

Thus, in each of the above embodiments, the differentiating characteristic of varying the number of detectable transitions of patterns of the servo bands may comprise one or more of the patterns of the servo bands. Once the differentiating characteristic is employed to identify the servo band being read by the servo transducer, the determination does not need to be repeated. Only if the servo transducer is moved out of a servo band, for example, to another servo band, does the open loop character of the servo system require that the newly encountered servo band be identified.

Figure 16:
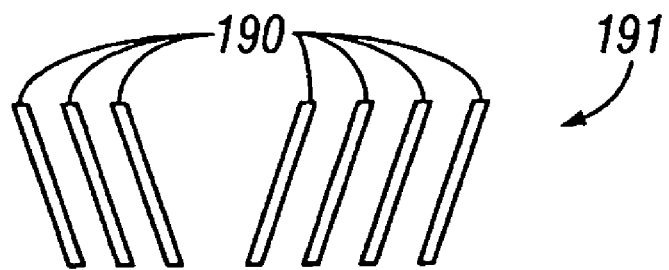
FIG. 16 is a representation of two separate servo bands of FIG. 1, having an embodiment of differentiating characteristics with respect to each other, in accordance with the present invention, comprising variations in stripe width.

FIG. 16 illustrates another type of differentiating characteristics, comprising variations in stripe width. As pointed out by U.S. Pat. No. 5,930,065, the "transition" of a servo system typically comprises a set of two actual transitions, a first transition having a first switch in magnetic polarity, followed by an opposite switch in magnetic polarity. In many servo systems, only one direction of polarity switching is recognized, ignoring the other.

Herein, the set of two actual transitions is termed a "stripe", and is defined as a set of sequential alternating opposite polarity detectable transitions.

In the example of FIG. 16, the stripe width of the stripes 190 of separate servo band 191 are narrower in width than stripes 192 of separate servo band 193. The widths of the stripes are in the longitudinal direction of the tape, and the variations are characterized as variations in the longitudinal distance between the sequential alternating opposite polarity detectable transitions of the sets of detectable transitions.

The variations are detected by detecting the timing and polarities of the sets of transitions, determining the sets of transitions, or leading and trailing edges of the stripes, by the polarities of the transitions, and then determining the width of the stripes by the timing between the set of transitions. The variations are determined, for example, by comparing the stripe widths of separate servo bands, or comparing the distance (timing) between the transitions of a set (stripe) to the distance (timing) between sets (stripes).

Figure 17:
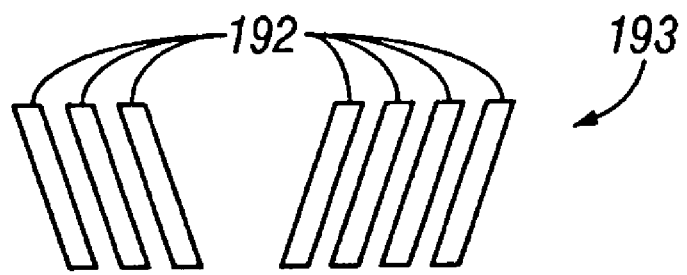
FIG. 17 is a representation of two separate servo bands of FIG. 1, having an embodiment of differentiating characteristics with respect to each other, in accordance with the present invention, comprising reversed polarities of stripes.
Figure 17:
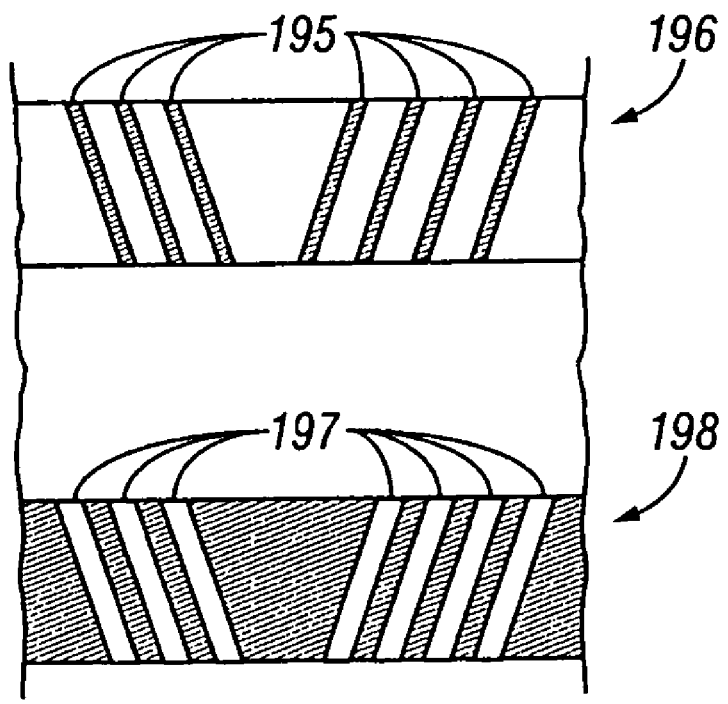

FIG. 17 illustrates still another type of differentiating characteristic, comprising reversed polarities of the stripes, or sets of detectable transitions. In the example of FIG. 17, the shaded areas represent a magnetic field in a first direction, and the unshaded areas represent a magnetic field in a second direction opposite to the first direction. Thus, the stripes 195 of separate servo band 196 have reversed polarities with respect to the stripes 197 of separate servo band 198. The stripes 195 and 197 comprise sets of sequential alternating opposite polarity detectable transitions.

The variations are detected by detecting the timing and polarity of the sets of transitions. In one example, the timing (distance) between the detectable transitions of a set is different from the timing (distance) between the sets of transitions, allowing determination of the sets of transitions. The polarities of the transitions allow determination of which polarities are reversed, to identify the separate servo bands.

Lateral alignment, if any, is independent of the variations in width or reversal of polarities.

Figures 10, 11:
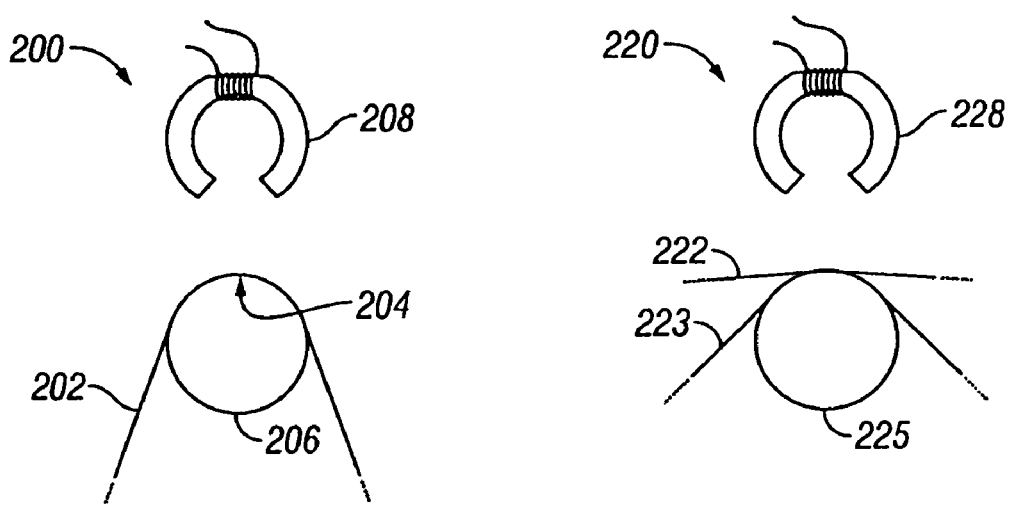
FIG. 10 is a schematic representation of an embodiment of a magnetic imprinter in accordance with the present invention, which magnetically imprints the detectable transitions of a plurality of separate servo bands on a magnetic tape media.
FIG. 11 is a schematic representation of an alternative embodiment of a magnetic imprinter in accordance with the present invention, which magnetically imprints the detectable transitions of a plurality of separate servo bands on a magnetic tape media.

FIG. 10 illustrates an embodiment of a magnetic imprinter servo writer 200 in accordance with the present invention, which magnetically imprints the detectable transitions of a plurality of separate servo bands on a magnetic tape media in accordance with methods of the present invention to provide differentiating characteristics with respect to the separate servo bands. A magnetic tape 202 onto which the servo patterns are to be recorded is wound around a curved portion of the circumference 204 of a drum 206 such that the curved portion is adjacent an electromagnet 208 on the opposite side of the tape that projects a magnetic field of flux outwardly toward the tape. A sequence of raised bands is provided on the circumference 204 of the drum in the desired servo pattern. As is understood by those of skill in the art, the drum 204 shields the magnetic tape with which the raised bands have contact, while the external electromagnet 208 projects a magnetic field onto the tape, leaving the desired servo pattern of detectable transitions imprinted on the magnetic tape. U.S. Pat. No. 5,689,384 discusses the technique in more detail.

In accordance with the present invention, the sequence of raised bands provided on the circumference 204 of the drum 206 comprises one of the patterns of FIG. 3 or 4, comprising differing azimuthal orientations of the continuously longitudinally variable detectable transitions of the laterally aligned patterns of the separate servo bands 31 and 32 of FIG. 3, or of the separate servo bands 42 and 44 of FIG. 4; or one of the patterns of FIG. 5 or 6, comprising variations in gaps of the patterns of the separate servo bands 60 and 61 of FIG. 5, or of the separate servo bands 80 and 87 of FIG. 6; or one of the patterns of FIG. 7, 8 or 9, comprising variations in the number of detectable transitions of the patterns of the separate servo bands 123 and 128 of FIG. 7, of the separate servo bands 152, 153 and 160 of FIG. 8, or of the separate servo bands 171, 176 and 173 of FIG. 9, or of the variations in stripe width of separate servo bands 191 and 193 of FIG. 16, or polarity reversal of separate servo bands 196 and 198 of FIG. 17. The tape 202 is moved longitudinally by a drive or by the drum 206 relative to the servo writer 200, and the servo writer is positioned to write two or more of the separate servo bands on the tape, the separate servo bands positioned in sequence laterally across the tape; and the servo writer is operated to energize electromagnet 208 to write the separate servo bands on the tape.

A result of the magnetic imprinter 200 of FIG. 10 is that the drum continually rotates such that the patterns of the servo bands are continually repeated on the magnetic tape 202. Thus, the magnetic tape need not be moved longitudinally significant distances to determine the servo band that is being sensed.

Another embodiment of a magnetic imprinter servo writer 220 is illustrated in FIG. 11 in accordance with the present invention, which magnetically imprints the detectable transitions of a plurality of separate servo bands on a magnetic tape media in accordance with methods of the present invention to provide differentiating characteristics with respect to the separate servo bands. The magnetic imprinter 220 and methods are similar to the methods employed in the video tape industry to transfer video information from a master tape to a slave magnetic tape. As is known to those of skill in the art, the prerecorded master tape 222 has a coercivity different than that of a slave tape 223, such that, as the tapes are in contact on the surface of a drum 225 in the presence of an electromagnet 228, the magnetic pattern of the master tape 222 is imprinted on the slave tape 223.

In accordance with the present invention, at least one of the servo band patterns of the master tape 222 comprises one of the patterns of FIG. 3 or 4, comprising differing azimuthal orientations of the continuously longitudinally variable detectable transitions of the laterally aligned patterns of the separate servo bands 31 and 32 of FIG. 3, or of the separate servo bands 42 and 44 of FIG. 4; or one of the patterns of FIG. 5 or 6, comprising variations in gaps of the patterns of the separate servo bands 60 and 61 of FIG. 5, or of the separate servo bands 80 and 87 of FIG. 6; or one of the patterns of FIG. 7, 8 or 9, comprising variations in the number of detectable transitions of the patterns of the separate servo bands 123 and 128 of FIG. 7, of the separate servo bands 152, 153 and 160 of FIG. 8, or of the separate servo bands 171, 176 and 173 of FIG. 9, or of the variations in stripe width of separate servo bands 191 and 193 of FIG. 16, or polarity reversal of separate servo bands 196 and 198 of FIG. 17. The tape 223 is moved longitudinally relative to the servo writer 220 by a drive or the drum 225, and the servo writer is positioned to write two or more of the separate servo bands on the tape, the separate servo bands positioned in sequence laterally across the tape; and the servo writer is operated to energize electromagnet 208 as master tape 222 is moved longitudinally in contact with and at the same rate as the tape 223 to write the separate servo bands on the tape 223.

The master tape 222 of FIG. 11 may be the same length as the slave tape 223, such that the patterns of the servo bands may or may not repeat. Thus, the patterns of the servo bands may or may not be continually repeated on the magnetic tape 223. If not repeated, the magnetic tape will need to be moved longitudinally to the differentiating characteristic portion of the tape determine the servo band that is being sensed.

Figure 12:
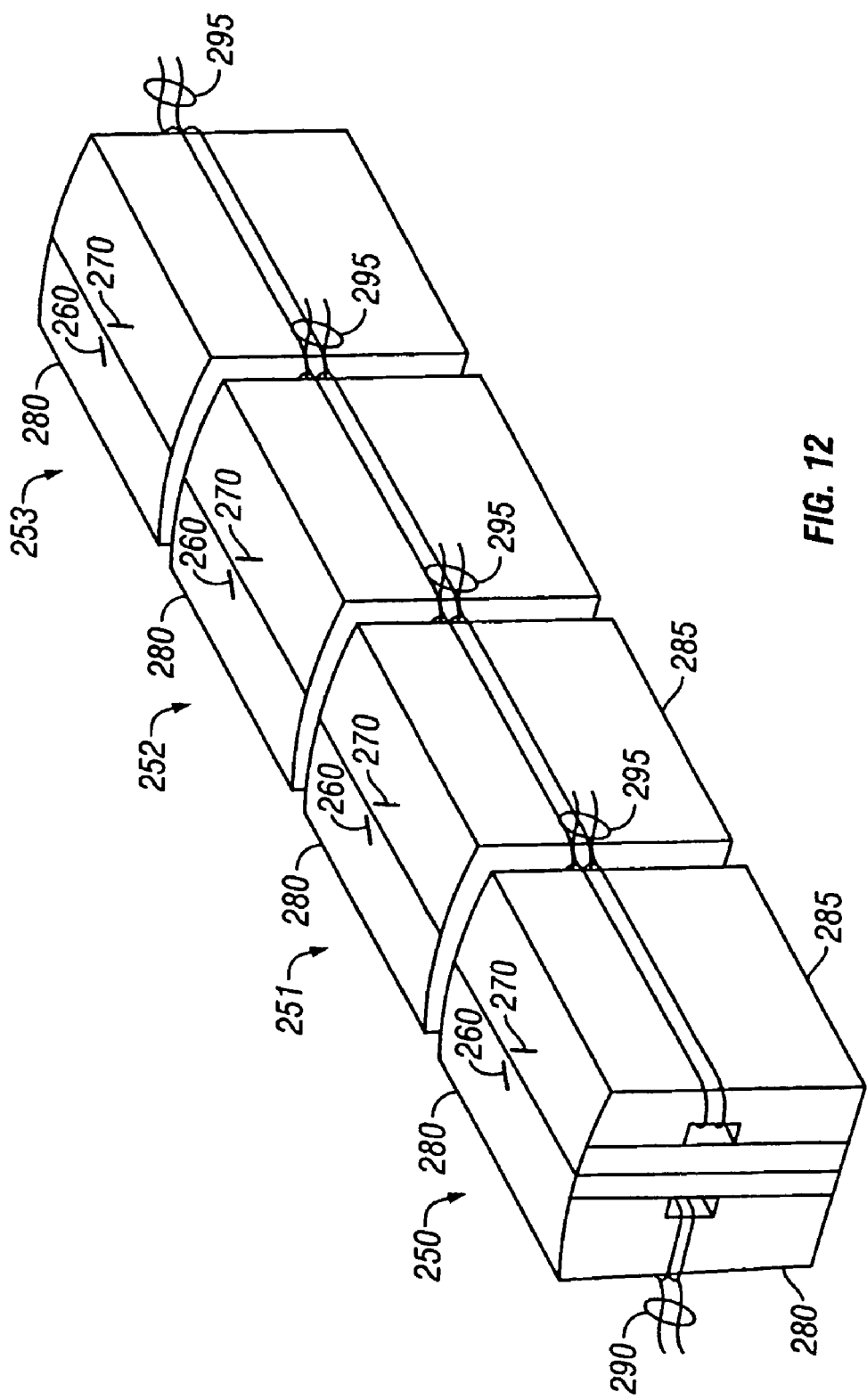
FIG. 12 is an isometric representation of an embodiment of a plurality of servo write heads for magnetically writing the detectable transitions of a plurality of separate servo bands on a magnetic tape media.
Figure 13:
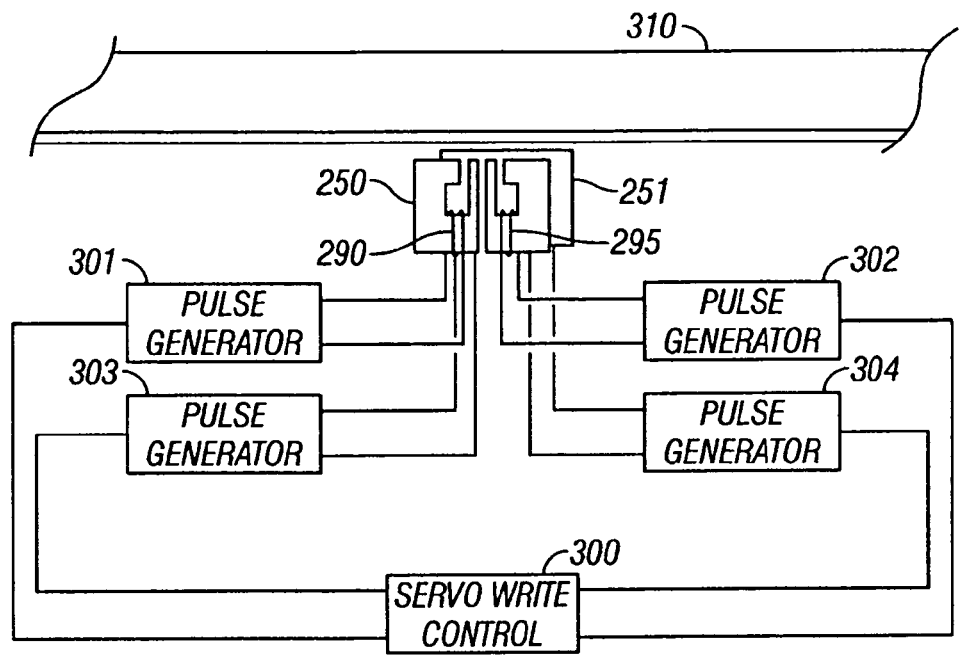
FIG. 13 is a schematic and block representation of servo writing apparatus in accordance with the present invention, for magnetically writing the detectable transitions of a plurality of separate servo bands on a magnetic tape media.

FIGS. 12 and 13 illustrate an embodiment of servo writing apparatus in accordance with the present invention, for magnetically writing the detectable transitions of a plurality of separate servo bands on a magnetic tape media in accordance with methods of the present invention. The servo writer comprises a plurality of servo write heads 250, 251, 252 and 253. Each of the servo write heads may also comprise separate write heads, or may comprise a single multi-gap write head, in accordance with the patterns of detectable transitions to be written.

For example, if the servo patterns to be written comprise one of the patterns of FIG. 3 or 4, comprising differing azimuthal orientations of the continuously longitudinally variable detectable transitions of the laterally aligned patterns of the separate servo bands 31 and 32 of FIG. 3, or of the separate servo bands 42 and 44 of FIG. 4, the servo write heads of FIG. 12 may or may not be separate, and comprise gaps 260 and 270 which are of differing azimuthal orientations at the adjacent servo write heads in accordance with the patterns to be written. A drive moves the tape longitudinally, and the gaps may then be pulsed simultaneously to record the transitions of the separate servo bands. Alternatively, if the servo patterns to be written one of the patterns of FIG. 5 or 6, comprising variations in gaps of the patterns of the separate servo bands 60 and 61 of FIG. 5, or of the separate servo bands 80 and 87 of FIG. 6; or one of the patterns of FIG. 7, 8 or 9, comprising variations in the number of detectable transitions of the patterns of the separate servo bands 123 and 128 of FIG. 7, of the separate servo bands 152, 153 and 160 of FIG. 8, or of the separate servo bands 171, 176 and 173 of FIG. 9, separate write heads 280 and 285 of FIG. 12 are employed with separate coils 290 and 295 to pulse the gaps with varied timings to record the transitions of the separate servo bands. If the variations in stripe width of the separate servo bands 191 and 193 of FIG. 16 are to be written, coils 290 and 295 of write heads 280 and 285 of FIG. 12 could be switched simultaneously, but the separate servo write heads 250, 251, 252, 253 are switched at different time intervals for the sets of detectable transitions to form variations in the stripe widths. To provide the reversed polarity sets of detectable transitions of the separate servo bands 196 and 198 of FIG. 17, coils 290 and 295 of write heads 280 and 285 of FIG. 12 could be switched simultaneously, but the separate servo write heads 250, 251, 252, 253 are switched in opposite directions to provide the sets of detectable transitions of reversed polarities. If the tape is D.C. biased before writing the servo bands, the separate servo bands 196 and 198 are biased at opposite polarities. An example of construction of servo write heads is provided in U.S. Pat. No. 5,689,384.

Referring additionally to FIG. 13, as a drive moves the tape longitudinally, the servo writer is operated in accordance with the present invention by a servo write control 300 which operates pulse generators 301, 302, 303 and 304 to magnetically pulse coils 290 and 295 of the servo write heads, e.g. of servo write heads 250 and 251, to record the detectable transitions of the plurality of separate servo bands on a tape 310 in at least one pattern of a sequence of a plurality of detectable transitions positioned longitudinally along said magnetic tape media, at least one of which detectable transitions is non-parallel to another of the detectable transitions in the pattern, and which patterns are written in accordance with methods of the present invention to provide differentiating characteristics with respect to the separate servo bands. Thus, if the servo patterns to be written comprise one of the patterns of FIG. 3 or 4, comprising differing azimuthal orientations of the continuously longitudinally variable detectable transitions of the laterally aligned patterns of the separate servo bands 31 and 32 of FIG. 3, or of the separate servo bands 42 and 44 of FIG. 4, the servo write heads of FIG. 12 comprise gaps 260 and 270 which are of differing azimuthal orientations at the adjacent servo write heads in accordance with the patterns to be written, and the gaps 260 and 270 are pulsed simultaneously by pulse generators 301 and 302, and by pulse generators 303 and 304 to record the transitions of the separate servo bands. Alternatively, if the servo patterns to be written one of the patterns of FIG. 5 or 6, comprising variations in gaps of the patterns of the separate servo bands 60 and 61 of FIG. 5, or of the separate servo bands 80 and 87 of FIG. 6; or one of the patterns of FIG. 7, 8 or 9, comprising variations in the number of detectable transitions of the patterns of the separate servo bands 123 and 128 of FIG. 7, of the separate servo bands 152, 153 and 160 of FIG. 8, or of the separate servo bands 171, 176 and 173 of FIG. 9, the separate coils 290 and 295 are pulsed with varied timings to record the transitions of the separate servo bands. If the variations in stripe width of the separate servo bands 191 and 193 of FIG. 16 are to be written, pulse generators 301 and 302 of FIG. 13 are operated at different pulse widths than pulse generators 303 and 304 to switch the servo write heads 250, 251, etc., of FIG. 12 at different time intervals for the sets of detectable transitions to form variations in the stripe widths. To provide the reversed polarity sets of detectable transitions of the separate servo bands 196 and 198 of FIG. 17, pulse generators 301 and 302 of FIG. 13 are operated at opposite polarities than pulse generators 303 and 304 to switch the servo write heads 250, 251, etc., of FIG. 12 at the reversed polarities.

Figure 14:
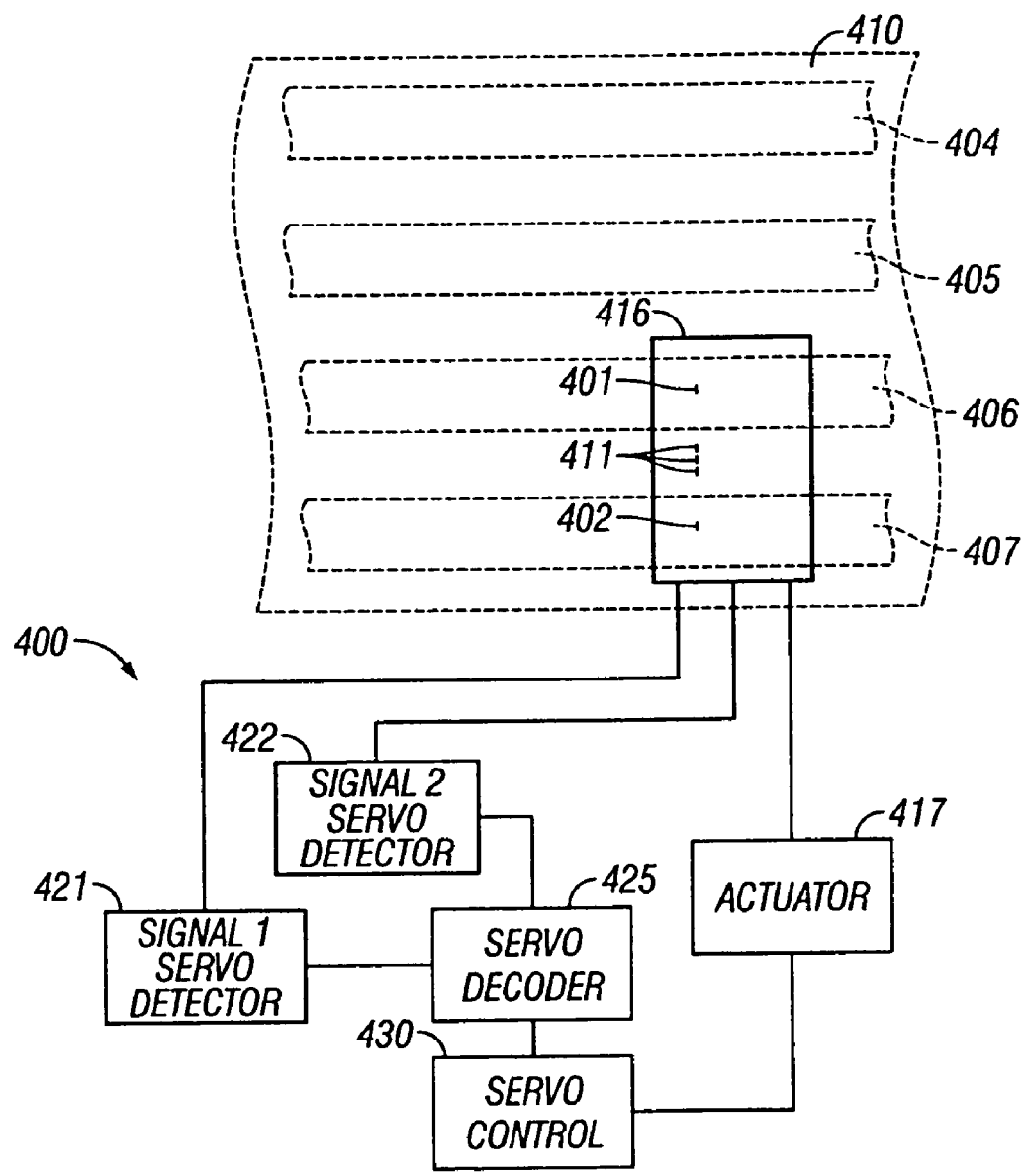
FIG. 14 is a schematic and block representation of servo transducers and a servo reader in accordance with the present invention, for reading servo information of a plurality of separate servo bands on a magnetic tape media.

FIG. 14 illustrates an embodiment of a servo reader 400 for reading servo information detected by at least one of servo transducers 401 and 402 from at least one of a plurality of separate servo bands 404, 405, 406 and 407 of a magnetic tape media 410. The separate servo bands are laterally positioned on the magnetic tape media, and are identifiable in accordance with the present invention. As discussed above, data tracks are positioned between the servo bands and read and/or written by read and/or write elements 411 of a head 416, with the separate servo transducers 401, 402 offset from the read and/or write elements, so as to track follow the servo track or tracks to guide the head along the data tracks.

The servo bands 404, 405, 406 and 407 comprise patterns of transitions recorded at more than one azimuthal orientation across the width of the servo band, and which are therefore non-parallel. The timing of the signal derived from reading at any point across the width of such a pattern varies continuously as the servo transducer 401, 402 of FIG. 14 is moved laterally across the servo track, since the servo transducer 20 is small compared to the width of the servo pattern. Lateral position sensing is achieved by deriving a ratio of two servo pattern intervals A and B of FIG. 2 and therefore is insensitive to tape speed during reading.

Each of the servo bands 404, 405, 406 and 407 provides the servo guidance for a group of data tracks, and the tape head is repositioned laterally within a servo band to access different data tracks, and is repositioned laterally to another servo band to access still further data tracks. The lateral positioning of the tape head 416 between servo bands is typically accomplished by an actuator 417, such as a stepper motor, which typically operates in open loop. Thus, as the tape head is repositioned between the servo bands, there is no feedback from the servo information to indicate that the switch from one servo band to any other servo band was successful, and, if the servo bands are substantially indistinguishable, at the supposed completion of the lateral movement, the tape head may be positioned at the wrong servo band, and the servo information will not indicate an error.

In accordance with an aspect of the present invention, wherein the separate servo bands 404, 405, 406 and 407 are positioned laterally across the magnetic tape, at least one of the patterns of a separate servo band is provided with at least one differentiating characteristic with respect to at least one of the laterally aligned patterns of another of the separate servo bands, the servo reader 400 employs the differentiating characteristic to identify the separate servo bands.

In the embodiment of FIG. 14, the detectable transitions sensed by the servo transducers 401 or 402 are detected by a corresponding servo detector 421 and 422. Either a desired one of the servo detectors 421 or 422 may be operated at a time, or both may be operated simultaneously. The servo detector 421, 422 detects the timing of the detectable transitions as sensed by the associated servo transducer 401, 402 to determine the lateral track position of the associated servo transducer with respect to the lateral width of the sensed separate servo band. Additionally a decoder 425 determines, from the detected transitions, which of the separate servo bands is being sensed by the transducer.

If the differentiating characteristic between the servo bands comprises differing azimuthal orientations of the detectable transitions of patterns of the separate servo bands, as discussed with respect to FIGS. 3 and 4, the servo band is identified by operating the actuator to alter the path of the servo transducer in the lateral direction and the servo decoder 425 determines whether the "A" timing, as discussed above, becomes shorter or longer. Alternatively, the actuator is operated to move the servo transducer toward the upper edge of the separate servo band, and the timing between detectable transitions measured to determine whether the timing would exceed the largest possible timing between that of detectable transitions of the next servo band, or whether the timing would be less than the expected timing of the next servo band, identifying the separate servo band.

If the differentiating characteristic comprise variations in gaps of the patterns of the separate servo bands, as in FIGS. 5 and 6, the servo decoder 425 identifies the servo band by comparing the timing between the transitions to measure the width of the gaps, as discussed above, or directly measuring a gap or gaps of a servo band comparing the measurement to other elements of the timing of the patterns of the servo band. Alternatively, the time of traverse between the bursts of two of the servo bands may be compared to determine which gap(s) are narrowed versus which gap(s) are expanded.

If the differentiating characteristic comprises variations in the number of detectable transitions of a pattern or patterns of one servo band with respect to at least one of the patterns of another of the separate servo bands, the servo decoder 425 determines which servo band is being sensed by counting the detectable transitions in the pattern. Alternatively, the numbers of transitions in patterns of one servo band may be compared to that of the next servo band. Still alternatively, or additionally, if the number of gaps is also varied, the servo decoder 425 may count the number of gaps in the pattern.

If the differentiating characteristic comprises the variations in stripe width of separate servo bands 191 and 193 of FIG. 16, the servo detector 421, 422 of FIG. 14 detects the polarities of the detectable transitions. The sequence of polarities determines the sets of transitions, or the leading and trailing edges of the stripes. The servo detectors 421, 422 also detect the timing between the transitions. The servo decoder 425 determines the width of the stripes by the timing between the set of transitions. The servo decoder 425 determines the variations in stripe width to identify the servo bands by, for example, comparing the stripe widths of separate servo bands, or comparing the distance (timing) between the transitions of a set (stripe) to the distance (timing) between sets (stripes).

If the differentiating characteristic comprises reversed polarities of the stripes of separate servo bands 196 and 198 of FIG. 17, the servo detector 421, 422 of FIG. 14 detects the polarities of the detectable transitions. The timing of the detectable transitions determines the sets of transitions, and the decoder 425 employs the polarities of the sets of transitions to determine which polarities are reversed, to identify the separate servo bands.

A servo control 430 operates the actuator 417 to position the magnetic tape head 416 laterally with respect to the magnetic tape media 410 in accordance with the detection of the servo detector 421, 422 and the track identification determination of the decoder 425.

Figure 15:
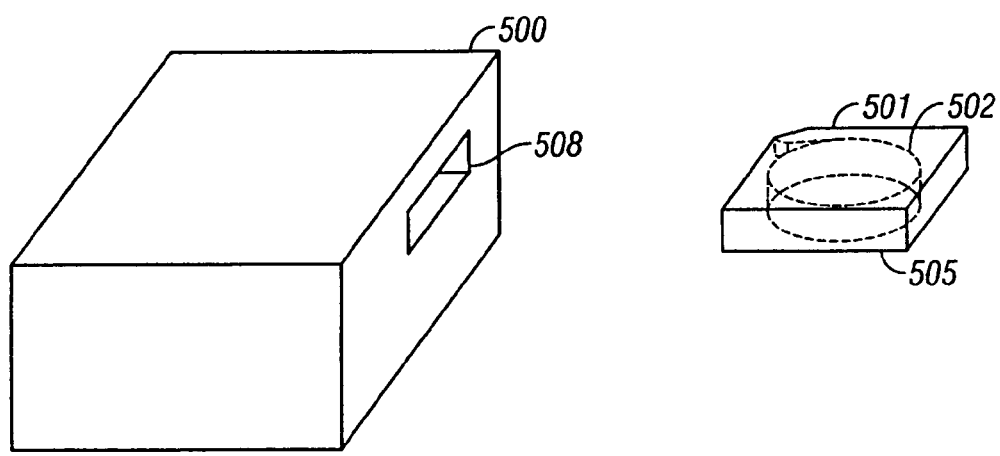
FIG. 15 is a schematic representation of a magnetic tape drive employing the servo reader of FIG. 14 and a magnetic tape media cartridge employing separate servo bands on magnetic tape media, in accordance with the present invention.

FIG. 15 illustrates a magnetic tape drive 500 employing the servo reader of FIG. 14, and a magnetic tape media cartridge 501 having a magnetic tape media 502 with separate servo bands on magnetic tape media, in accordance with the present invention.

The magnetic tape media cartridge 501 comprises a cartridge housing 505, and a magnetic tape media 502 housed within the cartridge housing. The magnetic tape media has servo information comprising a plurality of separate servo bands of at least one pattern of detectable transitions positioned longitudinally along the magnetic tape media, at least one of which detectable transitions is non-parallel to another detectable transition in the pattern. The separate servo bands are positioned laterally across the magnetic tape media; and at least one of the patterns of a separate servo band has at least one differentiating characteristic with respect to at least one of the patterns of another of the separate servo bands, as discussed above.

The magnetic tape drive 500 reads and/or writes data with respect to a magnetic tape media, such as the magnetic tape media 502 of cartridge 501. The cartridge 501 is loaded into the magnetic tape drive 500 at loader 508. The magnetic tape drive 500 has a magnetic tape head, such as head 416 of FIG. 14, and read and/or write channel for reading and/or writing data on the magnetic tape media 502 of FIG. 15. A drive mechanism moves the magnetic tape media longitudinally with respect to the magnetic tape head, and an actuator, such as actuator 417 of FIG. 14, positions the magnetic tape head 416 laterally with respect to the magnetic tape media. At least one servo transducer narrower than the lateral width of the separate servo bands, such as servo transducers 401, 402, sense the detectable transitions from at least one of the plurality of separate servo bands. A servo detector, such as servo detectors 421, 422, detects the detectable transitions as sensed by the servo transducer or transducers to determine the lateral track position of the servo transducer with respect to the lateral width of the separate servo bands, and the servo decoder 425 determines, from the detected transitions, which of the separate servo bands is being sensed by the transducer, as discussed above with respect to FIG. 14, and a servo control operates an actuator to position the head accordingly.

The illustrated embodiments relate to magnetic tape servo bands, and the present invention may also be applied to other types of linear data storage tape having separate servo bands, which may comprise optical tape.

The illustrated components and/or steps may be varied, combined, or combined functions may be separated, as is known to those of skill in the art. The illustrated steps may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A magnetic tape drive for reading and/or writing data with respect to a magnetic tape media, said magnetic tape media having prerecorded servo information in a plurality of separate servo bands comprising at least one pattern of detectable transitions positioned longitudinally along a magnetic tape media, at least one of which detectable transitions is non-parallel to another detectable transition in said pattern, said patterns comprising at least one gap between said non-parallel detectable transitions; and said separate servo bands positioned laterally across said magnetic tape media, at least one of said patterns of a separate said servo band having variations in said gap of said pattern with respect to at least one of said patterns of another of said separate servo bands; comprising:

- a magnetic tape head and read and/or write channel for reading and/or writing data on said magnetic tape media;
- a drive mechanism for moving said magnetic tape media longitudinally with respect to said magnetic tape head;
- an actuator for positioning said magnetic tape head laterally with respect to said magnetic tape media;
- at least one servo transducer narrower than the lateral width of said separate servo bands, for sensing said detectable transitions from at least one of said plurality of separate servo bands;
- a servo detector for detecting the timing of said detectable transitions as sensed by said at least one servo transducer to determine the lateral track position of said at least one servo transducer with respect to said lateral width of said separate servo bands;
- a decoder for determining, from said detected timing of said detectable transitions, said variations in said gap of said pattern with respect to at least one of said patterns of another of said separate servo bands, and determining from said determination of variations, which of said at least one of said separate servo bands is being sensed by said at least one servo transducer; and
- a servo control for operating said actuator to position said magnetic tape head laterally with respect to said magnetic tape media in accordance with said detection of said servo detector and said servo band determination of said decoder;

wherein said detectable transitions of a pattern are written in a first burst of at least one of said detectable transitions in a first azimuthal orientation, a second burst of at least one of said detectable transitions in a second azimuthal orientation, a third burst of at least one of said detectable transitions in said first azimuthal orientation, and a fourth burst of at least one of said detectable transitions in said second azimuthal orientation, and first gaps separating said first and said second bursts and separating said third and said fourth bursts, and second gaps separating said second and said third bursts and separating a sequentially adjacent said pattern; and wherein said variations in said gap of said patterns of said separate servo bands comprises an expanded one of a set of said first gaps and/or a set of said second gaps and narrowed one of a set of said first gaps and/or a set of said second gaps; and wherein said servo detector detects said timing to determine the lateral track position of said at least one servo transducer from said detectable transitions of said first and said second said bursts, and from said detectable transitions of said first and said third said bursts; and wherein said decoder determines which of said at least one of said separate servo bands is being sensed by said at least one servo transducer, from said variations in said sets of first gaps and/or said sets of second gaps of said pattern with respect to at least one of said patterns of another of said separate servo bands.

* * * * *